(12) United States Patent
Bresnahan

(10) Patent No.: US 8,991,416 B2
(45) Date of Patent: Mar. 31, 2015

(54) SHUTTLE VALVE

(75) Inventor: Kevin Bresnahan, Avon Lake, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 157 days.

(21) Appl. No.: 13/643,708

(22) PCT Filed: Apr. 6, 2011

(86) PCT No.: PCT/US2011/031349
§ 371 (c)(1),
(2), (4) Date: Oct. 26, 2012

(87) PCT Pub. No.: WO2011/136904
PCT Pub. Date: Nov. 3, 2011

(65) Prior Publication Data
US 2013/0037736 A1 Feb. 14, 2013

Related U.S. Application Data

(60) Provisional application No. 61/327,954, filed on Apr. 26, 2010.

(51) Int. Cl.
G05D 11/00 (2006.01)
F16K 11/044 (2006.01)
F16K 17/26 (2006.01)

(52) U.S. Cl.
CPC ............... *F16K 11/044* (2013.01); *F16K 17/26* (2013.01)
USPC ..................................... 137/112; 137/630.19

(58) Field of Classification Search
CPC ................................ F16K 11/044; F15B 13/02
USPC ................ 137/111, 112, 113, 630.19; 251/77
See application file for complete search history.

(56) References Cited

U.S. PATENT DOCUMENTS

| 2,811,979 | A | * | 11/1957 | Presnell .......................... 137/112 |
| 3,171,440 | A | * | 3/1965 | Napolitano ............... 137/630.19 |
| 3,454,029 | A | * | 7/1969 | Fredd .............................. 137/112 |
| 3,857,410 | A |   | 12/1974 | Bedo et al. |
| 6,257,268 | B1 | * | 7/2001 | Hope et al. ...................... 137/112 |
| 6,779,543 | B2 | * | 8/2004 | Hollister et al. ............... 137/102 |

FOREIGN PATENT DOCUMENTS

| DE | 10 2008 011766 | 9/2008 |
| GB | 1 040 850 | 9/1966 |
| WO | 2007/120070 | 10/2007 |

OTHER PUBLICATIONS

International Search Report and Written Opinion for corresponding Patent Application No. PCT/US2011/031349 dated Jun. 17, 2011.

\* cited by examiner

*Primary Examiner* — John Rivell
*Assistant Examiner* — R. K. Arundale
(74) *Attorney, Agent, or Firm* — Renner, Otto, Boisselle & Sklar, LLP

(57) ABSTRACT

A shuttle valve 8 includes a valve body 9, a shuttle 10, and an actuator mechanism 11. The shuttle valve 8 includes inlet ports 37 and 39 and outlet port 40. The shuttle 10 moves between first and second at rest positions to selectively connect one of the inlet ports to the outlet port and isolate the other inlet port from the outlet port. The actuator mechanism 11 includes first and second springs 63 and 66 and moves the shuttle 10 from one of its positions to another when a set pressure differential is attained between the inlet ports. The actuator mechanism 11 moves a partial stroke distance to move the shuttle 10 between its at rest positions and moves a full stroke distance to additionally open fluid communication between one of the inlet ports and the shuttle 10.

25 Claims, 4 Drawing Sheets

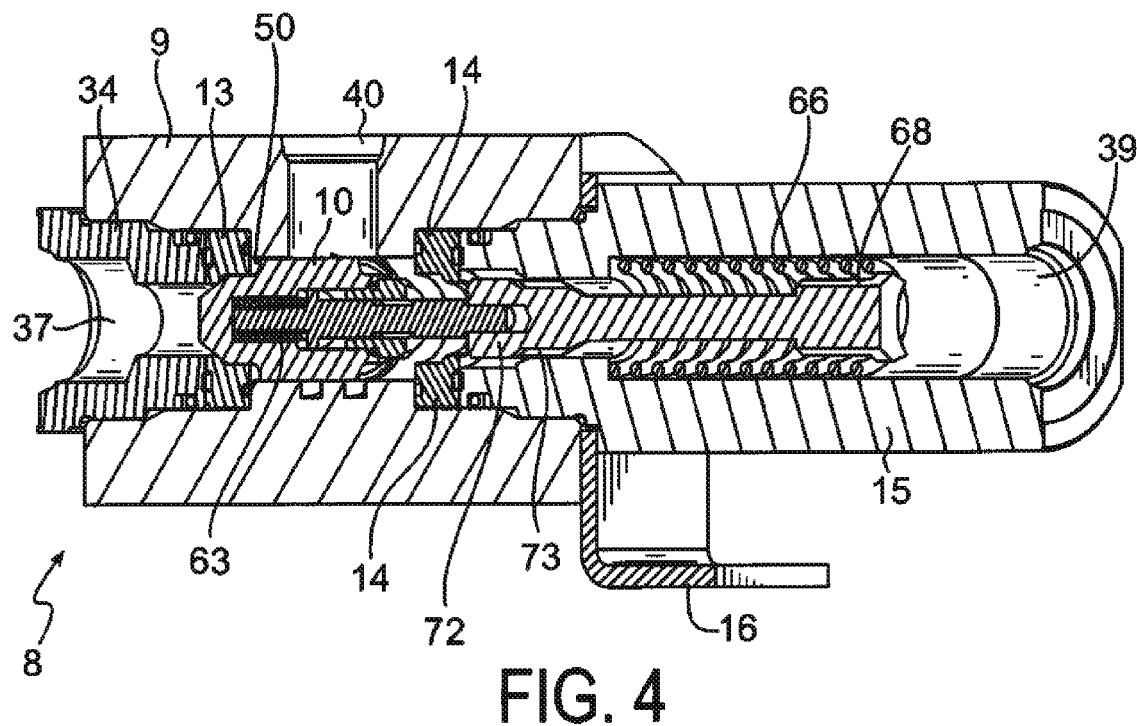
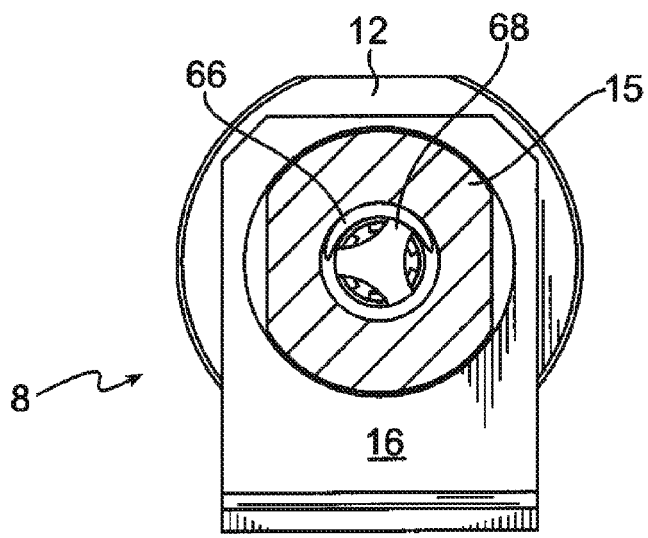

SHUTTLE VALVE

CROSS REFERENCE TO RELATED APPLICATIONS

The present application claims the benefit of the filing date of U.S. Provisional Patent Application Ser. No. 61/327,954, filed Apr. 26, 2010, the disclosure of which is incorporated herein by reference in its entirety.

TECHNICAL FIELD

This invention relates to a shuttle valve that includes a shuttle that connects the higher pressure one of two inlet ports to an outlet port. More specifically, this invention relates to a shuttle valve in which the shuttle is held in one position in order to prevent movement of the shuttle to another position until a required pressure differential between the inlet ports is reached.

BACKGROUND OF THE INVENTION

When a shuttle valve is used in a fluid system, the two inlet ports of the shuttle valve may be connected to different sources of fluid pressure. The different sources of fluid pressure may be at different pressure levels, and each of the pressure levels may increase or decrease with time. The shuttle closes fluid pressure communication between the lower pressure source inlet port and the outlet port. The shuttle also establishes and maintains fluid pressure communication between the higher pressure source inlet port and the outlet port. As used herein, the term fluid pressure communication or open with reference to two or more surfaces or volumes means that such surfaces or volumes are in relatively open fluid flow communication and/or at substantially similar pressure levels under normal operating conditions when such surfaces or volumes are in the described configuration. The term closed or leakage communication with reference to two or more surfaces or volumes means that such surfaces or volumes are in relatively restricted or substantially closed fluid flow communication and/or at substantially dissimilar pressure levels under normal operating conditions when such surfaces or volumes are in the described configuration. The terms inlet port or inlet and outlet port or outlet do not preclude fluid flow in a reverse direction such that an inlet becomes an outlet or an outlet becomes an inlet, unless the context otherwise so requires. The terms up, down, left and right are explanatory and do not preclude opposite sides or opposite directions, unless the context otherwise requires.

The shuttle, which may also be referred to as a valve member, may have a first at rest position and a second at rest position. In the first at rest position, the lower fluid pressure source may be connected to the first inlet port and the higher fluid pressure source may be connected to the second inlet port. In this configuration, a first valve surface of the poppet closes fluid pressure communication between the lower pressure source first inlet port and the outlet port while fluid pressure communication between the higher pressure source second inlet port and the outlet port is established and maintained. In the second at rest position, the relative pressure levels of the first and second inlet ports may reverse, so that the first inlet port may be at the higher pressure level and the second inlet port may be at the lower pressure level. In this configuration, a second valve surface of the shuttle poppet closes fluid pressure communication between the lower fluid pressure source second inlet port and the outlet port while fluid pressure communication between the higher fluid pressure source first inlet port and the outlet port is established and maintained. In this manner, the inlet port that is at the higher pressure level is connected to the outlet port.

The shuttle of the shuttle valve is moved between its first and second at rest positions in response to fluid pressure. More specifically, the shuttle is moved in response to the fluid pressure differential between the first inlet port and the second inlet port. Some shuttle valves may include biasing members to prevent movement of the shuttle poppet until a required pressure differential between the inlet ports is reached. Additionally, such shuttle valves may include cushioning devices to control the speed of movement of the shuttle. Further, such shuttle valves may be stacked together and sequenced so that the outlet of one shuttle valve is directly connected to and becomes the inlet to another shuttle valve.

Shuttle valves of this type may be used in any of several known applications. One such application is in drilling fields in which drilling rigs drill wells into the ground (including underwater surfaces) for locating and connecting to underground fluid resources such as oil or natural gas or for locating and connecting to underground chambers to pump fluids into the chambers for storage. In these uses, the shuttle valve may be used as a component in a blow out preventer circuit that is designed to change fluid flow paths and prevent or limit over pressure conditions that might blow out piping or other components during instances of rapid high pressure build up in the well. A blow out preventer is any fluid circuit that operates in any application to change the path of fluid flow in response to fluid pressure change. A drilling field blow out preventer is any such blow out preventer that is used in connection with well drilling into the ground.

SUMMARY OF THE INVENTION

The present invention provides a shuttle valve that connects one inlet port to an outlet port in one position and that connects another inlet port to the outlet port under predetermined pressure conditions.

The shuttle valve may include a body, a shuttle, and an actuator mechanism. The body may have a first inlet port, a second inlet port, an outlet port, and a cavity. The cavity may be connected by passages to the ports so that fluid flows through the cavity when passing from the first inlet port to the outlet port and when passing from the second inlet port to the outlet port.

The shuttle may be movably disposed in the cavity in response to fluid pressure and may have a first shuttle position closing one of the first and second inlet ports from the outlet port and enabling fluid flow from the other of the first and second inlet ports to the outlet port. The shuttle may have a second shuttle position closing the other of the first and second inlet ports from the outlet port and enabling fluid flow from the one of the first and second inlet ports to the outlet port.

The actuator mechanism may include an actuator rod movably disposed in the body between a first actuator rod position and a second actuator rod position and an intermediate actuator rod position between the first and second actuator rod positions. A lost motion connection may be provided between the actuator rod and the shuttle. The lost motion connection may include relatively moveable portions on the actuator rod and the shuttle, and the relatively moveable surfaces may enable a defined range of relative movement between the actuator rod and the shuttle. The shuttle may be disposed in the first shuttle position when the actuator rod is disposed in the first actuator rod position, and the shuttle may be disposed in the second shuttle position when the actuator rod is disposed in the intermediate actuator rod position and when the actuator rod is disposed in the second actuator rod position.

The actuator rod may include an actuator valve, and the actuator valve may close fluid pressure communication between the one inlet and the shuttle when the shuttle is in the first shuttle position and the actuator rod is in the first actuator rod position. The actuator rod may maintain the closed fluid pressure communication between the one inlet and the shuttle when the actuator rod moves from the first actuator rod position to the intermediate actuator rod position, and the actuator rod valve may open fluid pressure communication between the one inlet and the shuttle when the actuator rod moves from the intermediate actuator rod position to the second actuator rod position.

The actuator rod may move the shuttle from the first shuttle position to the second shuttle position while maintaining the closed fluid pressure communication between the one inlet and the shuttle when the actuator rod moves from the first actuator rod position to the intermediate actuator rod position. The actuator rod may open fluid pressure communication between the one inlet and the shuttle when the actuator rod moves from the intermediate actuator rod position to the second actuator rod position while the shuttle is in the second shuttle position.

The actuator mechanism may include a spring acting against the actuator rod and biasing the actuator rod to the first actuator rod position. The spring may act between the body and the actuator rod. The actuator mechanism may include another spring acting against the actuator rod. The other spring may act between the actuator rod and the shuttle. The other spring may preferably have a higher spring force acting against the actuator rod than the first mentioned spring when the actuator rod is in the intermediate actuator rod position. The shuttle may include a blind bore, and the spring may be disposed in the blind bore.

The actuator rod and the body may each include a stop member, and the stop members may act against one another when the shuttle is in the first shuttle position and when the actuator rod is in the first actuator rod position. The stop members may act against one another when the shuttle is in the second shuttle position and the actuator rod is in the intermediate actuator rod position, and the stop members may be disengaged when the shuttle is in the second shuttle position and the actuator rod is in the second actuator rod position.

The actuator rod and the body may cooperatively define a fluid flow passage. The fluid flow passage may be closed when the actuator rod is in the first and intermediate actuator rod positions and may be open when the actuator rod is in the second actuator rod position. The passage may include a plurality of longitudinal openings defined between the actuator rod and the body. The actuator rod may include an exterior surface, and the passage may include at least one longitudinal groove in the external surface. The actuator rod and the body may include radially opposite surfaces closing fluid pressure communication between the one of the inlets and the shuttle when the actuator rod is in the first and intermediate actuator rod positions. The actuator rod may travel a full actuator stroke distance between the first actuator rod position and the second actuator rod position, the shuttle may travel a distance less than the full actuator stroke distance when the shuttle travels from the first shuttle position to the second shuttle position. The actuator rod may travel a partial stroke distance less than the full stroke distance when the actuator rod travels between the first actuator rod position and the intermediate actuator rod position, and the shuttle travel distance may be equal to the partial actuator stroke distance. The actuator rod portion and the shuttle may include stop members limiting a range of movement of the actuator rod relative to the shuttle.

The invention provides various ones of the features and structures described above and in the claims set out below, alone and in combination, and the claims are incorporated by reference in this summary of the invention.

BRIEF DESCRIPTION OF THE DRAWINGS

Embodiments of this invention will now be described in further detail with reference to the accompanying drawings, in which:

FIG. 4 is a cross sectional perspective view of the shuttle valve shown in FIGS. 1-3, with the shuttle valve in its second at rest position; and FIG. 5 is a lateral cross sectional view taken along reference view line 5-5 in FIG. 1.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
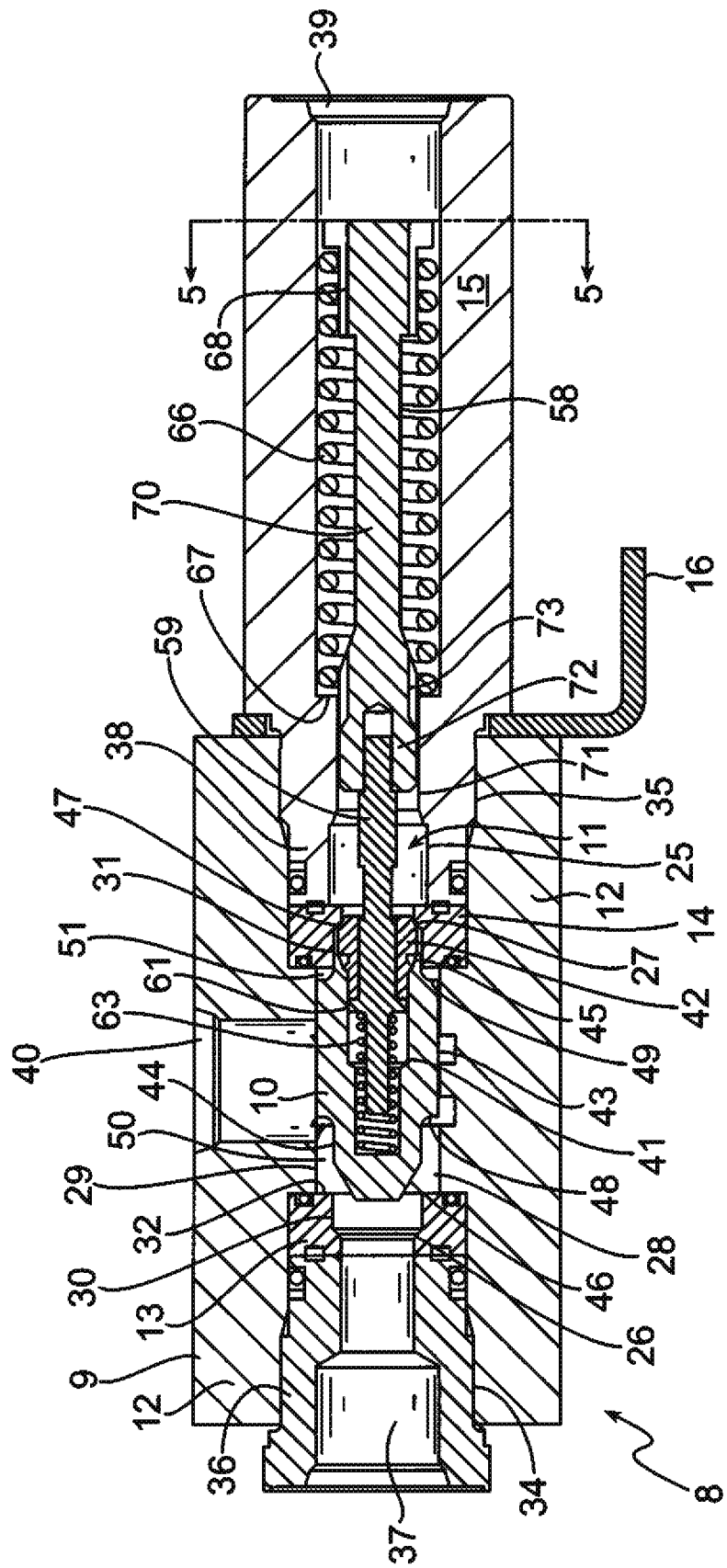
FIG. 1 is cross sectional view of a presently preferred embodiment of a shuttle valve incorporating certain principles of this invention, with the shuttle valve in a first at rest position.

Referring now to the drawings in greater detail, FIG. 1 illustrates a shuttle valve 8 having a valve body 9, a shuttle 10, and an actuator mechanism 11. The valve body 9 and shuttle 10 are of any suitable material, which is selected in a well known manner to accommodate the pressures, flow rates, temperatures, fluids, external environment, body and shuttle size, pipe or tube type and size and thread configuration or flange configuration used to connect the valve body 9 to other components, and other factors. In the preferred embodiment, the shuttle valve 8 accommodates, for example, fluid pressures up to 5,000 pounds per square inch and connects with pipe or tubing of ¼ inch through 1½ inch (Society of Automotive Engineers tube sizes 4 through 24). Unless otherwise mentioned or obvious from the description and drawings, the components of the shuttle valve 8 other than the shuttle 10 are preferably of machined 316 stainless steel material.

The valve body 9 in the preferred embodiment is constructed from multiple components for ease of machining and assembly, although at least some of the components could be a single piece unitary construction. The valve body 9 includes a first generally cylindrical housing portion 12, two identical cylindrical valve seat members 13 and 14 described further below, and a second cylindrical housing portion 15. A generally flat L-shaped mounting bracket 16 is captured between the housing portions 12 and 15 for mounting the shuttle valve 8 in a suitable circuit. A machined main passage 25 having a longitudinal axis 25a extends axially from end to end through the housing portions 12 and 15. The valve seats 13 and 14 are disposed in the main passage 25. The valve seat members 13 and 14 provide annular valve seats 26 and 27, respectively. A central cavity 28 of the main passage 25 extends between the valve seats 26 and 27. The central cavity 28 includes a larger diameter portion 29 and reduced diameter portions 30 and 31. The intersection of the larger diameter portion 29 with the reduced diameter portions 30 and 31 provides an annular radial wall 32 on the left side of the shuttle 10 and a similar radial wall on the right side of the shuttle 10.

The valve seat members 13 and 14 are slidably received in the main passage 25 and are secured in a manner further described below. The valve seat members 13 and 14 and various other components shown in FIG. 1 and described further below carry one or more polymeric seal devices to restrict fluid leakage. Any suitable seal devices can be used, such as, for example, O-rings or molded in place seals of a suitable material such as nitrile rubber or a combination of a nitrile rubber seal and a back up ring of a suitable thermosetting material such as polytetrafluoroethylene.

The portion of the main passage 25 that extends through the first housing portion 12 includes threaded portions 34 and 35. Threaded portion 34 threadably receives a plug 36, which secures the valve seat member 13 in place in the passage 25 and which provides a fluid pressure inlet 37 for the left side of the shuttle 10. Threaded portion 35 threadably receives a threaded nose portion 38 on the left end of the second housing portion 15. The second housing portion 15 secures the valve seat member 14 in place in the passage 25 and provides an inlet 39 for the right side of the shuttle 10. The first housing portion 12 includes an outlet 40, which is selectively connected to the inlets 37 and 39 by the shuttle 10 in the manner further described below.

The shuttle 10 is preferably of 17-4 precipitation hardened stainless steel, which has 17% chromium and 4% nickel, known as American Iron and Steel Institute 630 stainless steel. The shuttle 10 includes a generally cylindrical blind bore 41. The blind bore 41 is threaded, and the shuttle 10 includes a shuttle portion 42 that is threadably received in the blind bore 41. The shuttle portion 42 is generally cylindrical and provides an extension of the blind bore 41. The shuttle 10 further includes a larger diameter cylindrical central portion 43, first and second smaller diameter radially outwardly facing cylindrical surfaces or neck portions 44 and 45, and first and second conical nose portions 46 and 47. As further described below, the conical nose portions 46 and 47 provide first and second valve surfaces for the shuttle 10. The larger diameter central portion 43 and the smaller diameter surfaces 44 and 45 are connected by annular walls 48 and 49, respectively. As further described below, the first smaller diameter radially outwardly facing surface 44 of the shuttle 10 and the inwardly facing surface 29 of the valve body 9 and the annular walls 48 and 32 cooperatively define a variable volume cushioning cavity 50 when the shuttle 10 is in a leftward at rest position as viewed in FIG. 1. A controlled annular clearance is provided between the surfaces 43 and 29, and another controlled annular clearance is provided between the surfaces 30 and 44. These controlled annular clearances provide a leakage fluid flow path for fluid flowing out of the cushioning cavity 50. Similarly, as further described below, the second smaller diameter radially outwardly facing surface 45 of the shuttle 10 and the radially inwardly facing surface 29 of the valve body 9 and the annular walls 49 and 33 cooperatively define a variable volume cushioning cavity 51 when the shuttle 10 is in a rightward at rest position as shown in FIG. 1. A controlled annular clearance is provided between the surfaces 43 and 29, and another controlled annular clearance is provided between the surfaces 31 and 45. These controlled annular clearances provide a leakage fluid flow path for fluid flowing out of the cushioning cavity 51.

If desired, the cushioning passages shown and described in co-pending U.S. Non-Provisional patent application Ser. No. 12/633,058, filed Dec. 8, 2009, the disclosure of which is incorporated herein by reference, may be utilized in the shuttle valve 8. Additionally, the stacking arrangement shown and described in co-pending U.S. Provisional Application Ser. No. 61/323,982, filed Apr. 14, 2010 (corresponding International Patent Application Serial No. PCT/US2011/029528, filed Mar. 23, 2011), the disclosures of which are incorporated herein by reference, may be utilized in the shuttle valve 8.

As further shown in FIG. 1, the actuator mechanism 11 includes a generally cylindrical elongated actuator rod or piston 58. The actuator rod 58 includes left and right actuator rod portions 59 and 70 which are threadably secured together and operate as a unitary rod. The left end of actuator rod 58 is slidably received in blind bore 41 of shuttle 10. The left end of actuator 58 includes an annular enlarged diameter shoulder 61, which is captured in the blind bore 41 by the shuttle portion 42. A spring 63 is disposed in the blind bore 41 and acts between the shuttle 11 and the shoulder 61, to bias the actuator rod 58 to the position shown in FIG. 1 when the shuttle valve 8 is in its rightward at rest position. The shuttle portion 42 is threadably secured to the main portion of the shuttle 10 after assembly of the spring 63 and left end of the actuator rod 58 with its shoulder 61 in the blind bore 41. The shuttle portion 42 and shoulder 61 provide stop members that act against one another when the shuttle 10 and actuator rod 58 are in the positions shown in FIGS. 1 and 2. Other structures to retain the actuator rod 58 in the blind bore 41 and to provide the stop members could include a conventional snap ring.

The actuator mechanism 11 further includes another spring 66, which acts between a shoulder 67 formed on second housing portion 15 and an enlarged diameter end stop or spring retainer 68 of actuator rod 58. As further described further below, the spring 66 preferably has a smaller preload and spring rate than the spring 63 in the position shown in FIG. 1, so that the spring 66 will compress before the spring 63 begins to compress when the actuator rod 58 begins to move to the left from the position shown in FIG. 1. The outer peripheral surface of end stop 68 is fluted, to include longitudinally extending external grooves that permit open fluid flow between the enlarged diameter end stop 68 and the portion of the main passage 25 that extends through the second housing portion 15. The actuator rod 58 further includes an enlarged diameter valve portion 72 that is slidably disposed in reduced diameter portion 71 of passage 25. The valve portion 72 includes a circumferentially continuous land portion that slides in the portion 71 of passage 25 to prevent open fluid pressure communication through the passage portion 71 when the shuttle valve 8 is in the rightward position shown in FIG. 1. The valve portion 72 also includes a grooved portion 73 that includes longitudinally extending grooves in its outer peripheral surface to permit open fluid pressure communication through the passage portion 71 when the shuttle valve 8 is in its leftward position shown in FIG. 3, as further described below. An alternative valve construction for the land portion and valve portion could include a seal on the external peripheral surface of actuator rod 58 that would move toward and away from the passage portion 71 to close and open a flow path through the passage portion 71.

When the shuttle valve 8 is in its rightward at rest position shown in FIG. 1, the inlet 37 is in fluid communication with the outlet 40 and the forces acting on the shuttle 10 retain the shuttle 10 to the right. The force created by the fluid pressure on the left side of the shuttle 10 acting in a rightward direction, plus a biasing force in the rightward direction acting on the shuttle 10 provided by spring 66 acting through actuator rod 58 and its shoulder 61 in the blind bore 41, is higher than the force created by fluid pressure on the shuttle 10 acting in a leftward direction. This force balance on the shuttle 10 retains the shuttle 10 in this rightward at rest position. In this position, fluid communication between inlet 39 and outlet 40 is blocked by engagement of valve surfaces 27 and 47 and by the land 72 in the passage portion 71.

Figure 2:
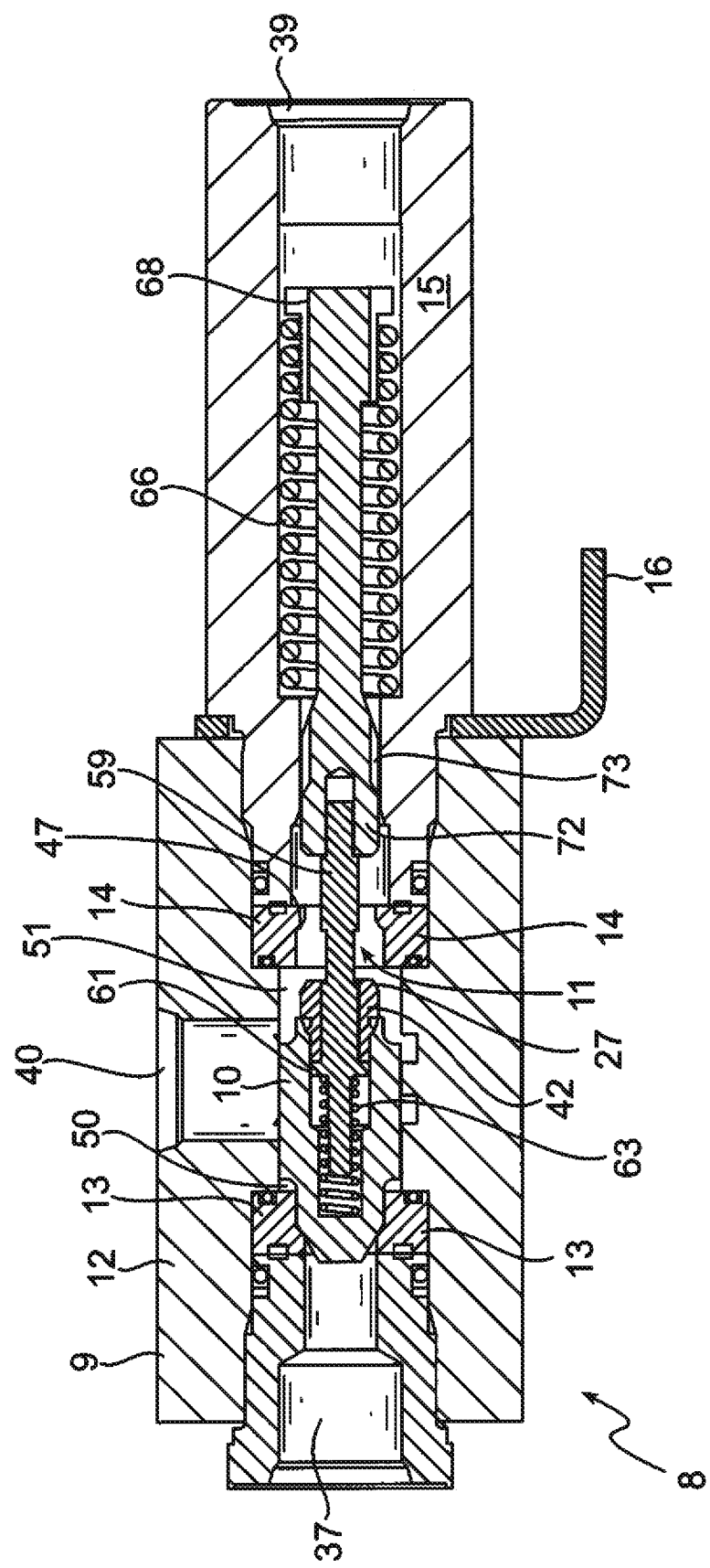
FIG. 2 is a view similar to FIG. 1, but with the shuttle valve in an intermediate position.

When the fluid pressure on the tight side of the shuttle 10 increases to a sufficient pressure level above that on the left side of the shuttle 10, the shuttle valve 8 begins to move from its at rest position shown in FIG. 1 to an intermediate position shown in FIG. 2. This occurs when the above described forces acting on the shuttle 10 in the leftward direction exceed the forces acting on the shuttle 10 in the rightward direction. When the shuttle valve 8 is in the rightward at rest position shown in FIG. 1, increases in fluid pressure in the inlet port 39 relative to the inlet port 37 will act on the net lateral cross sectional area of the actuator rod 58 in the housing portion 15 that is exposed to such pressure in the inlet port 39. This creates a force on the actuator rod 58 acting to the left, and this leftward force is transmitted from the actuator rod 58 to the shuttle 10 through the actuator rod shoulder 61 and the spring 63. When the fluid pressure acting against the actuator rod 58 in the leftward direction reaches a required pressure level, this leftward acting force of the actuator rod 58 against the shuttle 10 begins to exceed the total rightward acting forces on the shuttle 10 imposed by fluid pressure in inlet port 37 and by the spring 66. As movement of the shuttle 10 to the left continues, on the left side of the shuttle 10 the smaller diameter portion 44 of the shuttle 10 moves into the portion 30 to fully define the cushioning cavity 50 and to isolate the lower pressure on the left side of the shuttle 10. The volume of the cushioning cavity 50 is variable and is reduced as the shuttle 10 continues its movement to the left. The fluid in the cushioning cavity 50 leaks from the cushioning cavity 50 during this movement, and the cushioning cavity 50 attains its minimum volume when the surfaces 46 and 26 engage and the shuttle 10 reaches its intermediate position shown in FIG. 2.

In the position shown in FIG. 2, the shuttle 10 has moved a full stroke shuttle distance from the position shown in FIG. 1 and the actuator rod has moved a partial stroke actuator rod distance from the position shown in FIG. 1. The longitudinal extent of this partial stroke distance of the actuator rod 58 is less than the longitudinal extent of the overlapping surfaces 72 and 71, so that the inlet 39 remains isolated from the shuttle 10. The outlet 40 remains isolated from the inlet 37 by engagement of valve surfaces 26 and 46. Spring 66 is compressed further during movement from the at rest position shown in FIG. 1 to the intermediate position shown in FIG. 2, but spring 63 is not further compressed during this movement. The shoulder 61 of the left end of actuator rod 58 transmits this movement of the actuator rod 58 to the shuttle 10 through the spring 63 to cause corresponding movement of the shuttle 10 from the rightward at rest position to the leftward at rest shuttle position.

Figure 3:
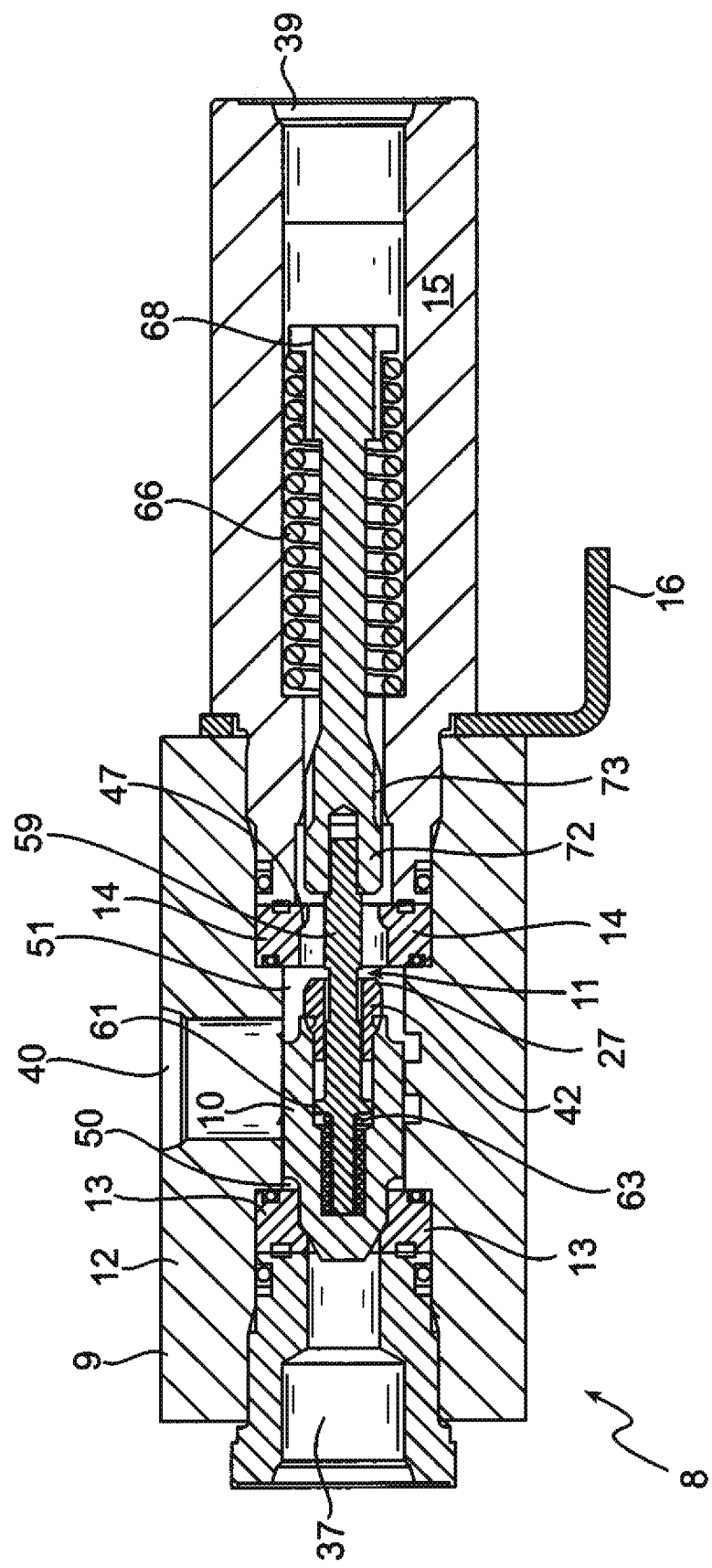
FIG. 3 is a view similar to FIG. 1, but with the shuttle valve in a second at rest position.

After the intermediate position shown in FIG. 2 is reached, further increases in fluid pressure in the inlet port 39 cause the shuttle valve 8 to move from its intermediate position shown in FIG. 2 to a leftward at rest position shown in FIG. 3. This is achieved by the increased fluid pressure acting against actuator rod 58 and causing the actuator rod 58 to continue to compress spring 66 and continue to move actuator rod 58 to the left. This provides a full stroke distance for movement of the actuator rod 58 from its rightward at rest position shown in FIG. 1 to its leftward at rest position shown in FIG. 3. This full stroke movement distance for actuator rod 58 is significantly greater than the full stroke movement of the shuttle 10 from its rightward at rest position shown in FIG. 1 to its leftward at rest position shown in FIGS. 2 and 3. This full stroke distance is also greater than the longitudinal extent of the overlapping radial surfaces of the actuator valve 71, 72.

Since the shuttle 10 cannot move further to the left from its leftward at rest position shown in FIG. 2 due to engagement of the valve surfaces 26 and 46, the leftward force on actuator rod 58 created by pressure in inlet 39 begins to compress spring 63. This provides a lost motion connection between the actuator rod 58 and the shuttle 10 with surfaces on the actuator rod 58 and shuttle 10 that are moveable relative to one another. The lost motion connection enables a defined range of continued movement of actuator rod 58 to the left relative to the shuttle 10, so that the land portion 72 moves to the left out of the passage portion 71 while shuttle 10 remains stationary and engagement of the valve surfaces 26 and 46 is maintained. When this occurs, fluid pressure communication from inlet port 39 to outlet port 40 is established through the longitudinal grooves in the end stop 68 of the actuator rod 58 and through the grooves in the grooved portion 73 of the actuator rod 58. The actuator 58 continues this leftward movement from the intermediate position shown in FIG. 2, until the leftward at rest position shown in FIG. 3 is attained. In this leftward at rest position, the inlet port 37 is isolated from the outlet port 40 while fluid pressure communication between the inlet port 39 and outlet port 40 through the longitudinal grooves in the end stop 68 of the actuator rod 58 and through the grooves in the grooved portion 73 of the actuator rod 58 is maintained. This fluid flow path in the leftward at rest position is shown in FIG. 3 and is also illustrated in FIG. 4. Also, portions of this fluid flow path may be seen in the lateral cross sectional view illustrated in FIG. 5.

The above description of the operation of the shuttle valve 8 is also generally applicable to the operation of the shuttle valve 8 when the shuttle 10 starts from and moves to the right from its leftward or other at rest position shown in FIG. 3. In this case, the valve surfaces 26 and 46 start from a closed position shown in FIG. 3 while the valve surfaces 27 and 47 and the valve surfaces 71, 72, 73 start from an open position. The fluid pressure in the inlet port 39 is no longer sufficient to retain the actuator valve 71, 72, 73 in its open position. The actuator rod 58 moves back to its intermediate position shown in FIG. 2 to close actuator valve 71, 72, 73 while the shuttle 10 remains in its leftward at rest position, by operation of the lost motion connection described above. The shuttle 10 then begins its movement to the right against the reduced force of the reduced fluid pressure on the right side of the shuttle 10 acting in a leftward direction and the reduced spring force, and the valve surface 46 moves away from the valve surface 26 to open the valve. As the movement of the shuttle 10 continues its movement to the right back toward the one at rest position shown in FIG. 1, the cushioning cavity 51 is formed. The shuttle 10 reaches its rightward at rest position when the valve surfaces 47 and 27 engage.

The shuttle valve 8 may be used in systems that require opening and closing fluid pressure communication among various components in the system. The shuttle valve 8 may be particularly useful as a component in a blow out preventer circuit in drilling fields, in which drilling rigs drill wells into the ground (including underwater surfaces) for locating and connecting to underground fluid resources such as oil or natural gas or for locating and connecting to underground chambers to pump fluids into the chambers for storage. Specifically, the shuttle valve 8 may be used as a component in a blow out preventer circuit that is designed to change fluid flow paths and prevent or limit over pressure conditions that might blow out piping or other components during instances of rapid high pressure build up in the well.

Presently preferred embodiments of the invention are shown and described in detail above. The invention is not, however, limited to these specific embodiments. Various changes and modifications can be made to this invention without departing from its teachings, and the scope of this invention is defined by the claims set out below. Also, while the terms first and second, one and another, left and right are used to more clearly describe the structure and operation of the shuttle valve 8, it should be understood these terms are used only for purposes of clarity and may be interchanged when referring to different sides of the shuttle valve 8.

What is claimed is:

1. A shuttle valve comprising a body, a shuttle, and an actuator mechanism;
   said body having a first inlet port, a second inlet port, an outlet port, and a cavity, said cavity being connected by passages to said ports, wherein a first passage extends from said cavity to said first inlet port, and a second passage extends from said cavity to said second inlet port, so that fluid flows through said cavity when passing from said first inlet port to said outlet port and when passing from said second inlet port to said outlet port;
   said shuttle being movably disposed in said cavity in response to fluid pressure and having a first shuttle position for closing one of said first and second inlet ports from said outlet port and enabling fluid flow from the other of said first and second inlet ports to said outlet port, said shuttle having a second shuttle position for closing the other of said first and second inlet ports from said outlet port and enabling fluid flow from said one of said first and second inlet ports to said outlet port;
   said actuator mechanism including an actuator rod movably disposed in said body between a first actuator rod position and a second actuator rod position and an intermediate actuator rod position between said first and second actuator rod positions, and a lost motion connection between said actuator rod and said shuttle;
   wherein said shuttle is disposed in said first shuttle position when said actuator rod is disposed in said first actuator rod position, and said shuttle is disposed in said second shuttle position when said actuator rod is in said second actuator rod position;
   wherein said actuator rod extends into one of said first and second passages when said actuator rod is in said first actuator rod position, and wherein said actuator rod does not extend into the other one of said first and second passages when said actuator rod is in said second actuator rod position.

2. A shuttle valve as set forth in claim 1, wherein said lost motion connection includes relatively moveable portions on said actuator rod and said shuttle, said relatively moveable surfaces enabling a defined range of relative movement between said actuator rod and said shuttle, wherein said shuttle is disposed in said second shuttle position when said actuator rod is disposed in said intermediate actuator rod position and when said actuator rod is disposed in said second actuator rod position.

3. A shuttle valve as set forth in claim 2, wherein said actuator rod includes an actuator valve, said actuator valve closing fluid pressure communication between said one inlet and said shuttle when said shuttle is in said first shuttle position and said actuator rod is in said first actuator rod position, said actuator rod maintaining said closed fluid pressure communication between said one inlet and said shuttle when said actuator rod moves from said first actuator rod position to said intermediate actuator rod position, and said actuator rod valve opening fluid pressure communication between said one inlet and said shuttle when said actuator rod moves from said intermediate actuator rod position to said second actuator rod position.

4. A shuttle valve comprising a body, a shuttle, and an actuator mechanism;
   said body having a first inlet port, a second inlet port, an outlet port, and a cavity, said cavity being connected by passages to said ports so that fluid flows through said cavity when passing from said first inlet port to said outlet port and when passing from said second inlet port to said outlet port;
   said shuttle being movably disposed in said cavity in response to fluid pressure and having a first shuttle position closing one of said first and second inlet ports from said outlet port and enabling fluid flow from the other of said first and second inlet ports to said outlet port, said shuttle having a second shuttle position closing the other of said first and second inlet ports from said outlet port and enabling fluid flow from said one of said first and second inlet ports to said outlet port;
   said actuator mechanism including an actuator rod movably disposed in said body between a first actuator rod position and a second actuator rod position and an intermediate actuator rod position between said first and second actuator rod positions, said actuator rod closing fluid pressure communication between said one inlet and said shuttle when said shuttle is in said first shuttle position and said actuator rod is in said first actuator rod position, said actuator rod moving said shuttle from said first shuttle position to said second shuttle position while maintaining said closed fluid pressure communication between said one inlet and said shuttle when said actuator rod moves from said first actuator rod position to said intermediate actuator rod position, and said actuator rod opening fluid pressure communication between said one inlet and said shuttle when said actuator rod moves from said intermediate actuator rod position to said second actuator rod position while said shuttle is in said second shuttle position.

5. A shuttle valve as set forth in claim 4, wherein said actuator mechanism includes a spring acting against said actuator rod and biasing said actuator rod to said first actuator rod position.

6. A shuttle valve as set forth in claim 5, wherein said spring acts between said body and said actuator rod.

7. A shuttle valve as set for the in claim 6, wherein said actuator mechanism includes another spring acting against said actuator rod.

8. A shuttle valve as set forth in claim 4, wherein said other spring acts between said actuator rod and said shuttle.

9. A shuttle valve as set forth in claim 8, wherein said other spring has a higher spring force acting against said actuator rod than said first mentioned spring when said actuator rod is in said intermediate actuator rod position.

10. A shuttle valve as set forth in claim 4, wherein said shuttle includes a blind bore, said spring is disposed in said blind bore, said actuator rod and said body each include a stop member, said stop members act against one another when said shuttle is in said first shuttle position and when said actuator rod is in said first actuator rod position.

11. A shuttle valve as set forth in claim 10, wherein said stop members act against one another when said shuttle is in said second shuttle position and said actuator rod is in said intermediate actuator rod position, and said stop members are disengaged when said shuttle is in said second shuttle position and said actuator rod is in said second actuator rod position.

12. A shuttle valve as set forth in claim 4, wherein said actuator rod and said body cooperatively define a fluid flow passage.

13. A shuttle valve as set forth in claim 12, wherein said fluid flow passage is closed when said actuator rod is in said first and intermediate actuator rod positions and is open when said actuator rod is in said second actuator rod position.

14. A shuttle valve as set forth in claim 4, wherein said shuttle is in said first shuttle position when said actuator rod is in said first actuator rod position, said shuttle is in said second shuttle position when said actuator rod is in said intermediate and second actuator rod positions.

15. A shuttle valve as set forth in claim 14, wherein said actuator rod and said body cooperatively define at least one fluid flow passage, said fluid flow passage is closed when said actuator rod is in said first actuator rod position and is open when said actuator rod is in said second actuator rod position.

16. A shuttle valve as set forth in claim 15, wherein said passage is closed when said actuator rod is in said intermediate actuator rod position.

17. A shuttle valve as set forth in claim 16, wherein said passage includes a plurality of longitudinal openings defined between said actuator rod and said body.

18. A shuttle valve as set forth in claim 16, wherein said actuator rod includes an exterior surface, said passage includes at least one longitudinal groove in said external surface.

19. A shuttle valve as set forth in claim 15, wherein said actuator rod and said body include radially opposite surfaces closing fluid pressure communication between said one of said inlets and said shuttle when said actuator rod is in said first and intermediate actuator rod positions.

20. A shuttle valve as set forth in claim 17, wherein said actuator rod travels a full actuator stroke distance between said first actuator rod position and said second actuator rod position, said shuttle travels a distance less than said full actuator stroke distance when said shuttle travels from said first shuttle position to said second shuttle position.

21. A shuttle valve as set forth in claim 20, wherein said actuator rod travels a partial stroke distance less than said full stroke distance when said actuator rod travels between said first actuator rod position and said intermediate actuator rod position, said shuttle travel distance is equal to said partial actuator stroke distance, and said longitudinal extent is less than said partial actuator stroke distance.

22. A shuttle valve as set forth in claim 4, wherein said shuttle includes a blind bore, and said actuator rod includes a portion slidably disposed in said blind bore.

23. A shuttle valve as set forth in claim 22, including a spring located in said blind bore acting between said shuttle and said actuator rod.

24. A shuttle valve as set forth in claim 23, wherein said actuator rod portion and said shuttle include stop members limiting a range of movement of said actuator rod relative to said shuttle.

25. A shuttle valve comprising a body, a shuttle, and an actuator mechanism;

said body having a first inlet port, a second inlet port, an outlet port, and a cavity, said cavity being connected by passages to said ports so that fluid flows through said cavity when passing from said first inlet port to said outlet port and when passing from said second inlet port to said outlet port;

said shuttle having valve surfaces on opposing shuttle ends for engaging with said body and restricting fluid flow, said opposing valve surfaces being fixed in relation to one another, said shuttle being movably disposed in said cavity in response to fluid pressure and having a first shuttle position for closing one of said first and second inlet ports from said outlet port and enabling fluid flow from the other of said first and second inlet ports to said outlet port, said shuttle having a second shuttle position for closing the other of said first and second inlet ports from said outlet port and enabling fluid flow from said one of said first and second inlet ports to said outlet port;

said actuator mechanism including an actuator rod movably disposed in said body between a first actuator rod position and a second actuator rod position and an intermediate actuator rod position between said first and second actuator rod positions, and a lost motion connection between said actuator rod and said shuttle.

* * * * *